Patented Apr. 22, 1941

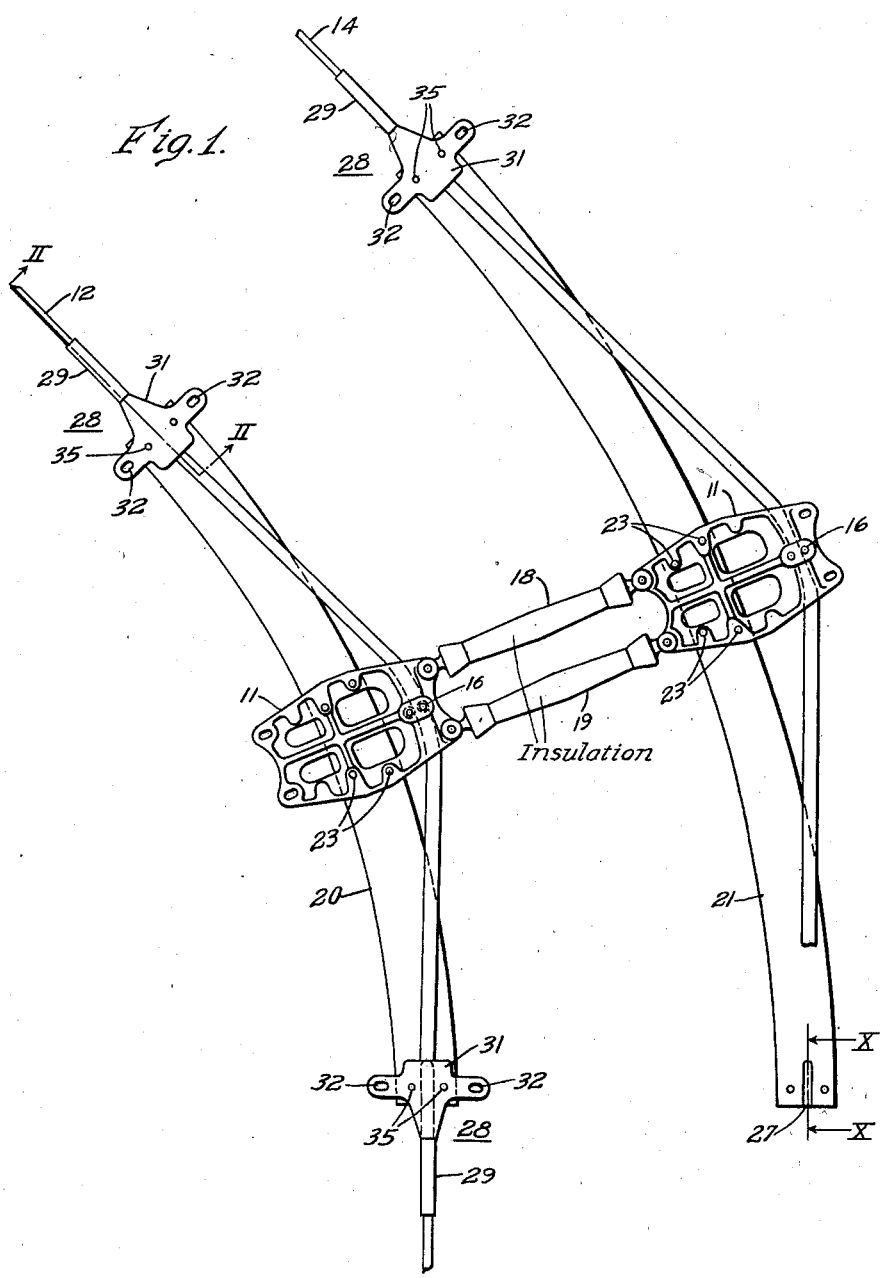

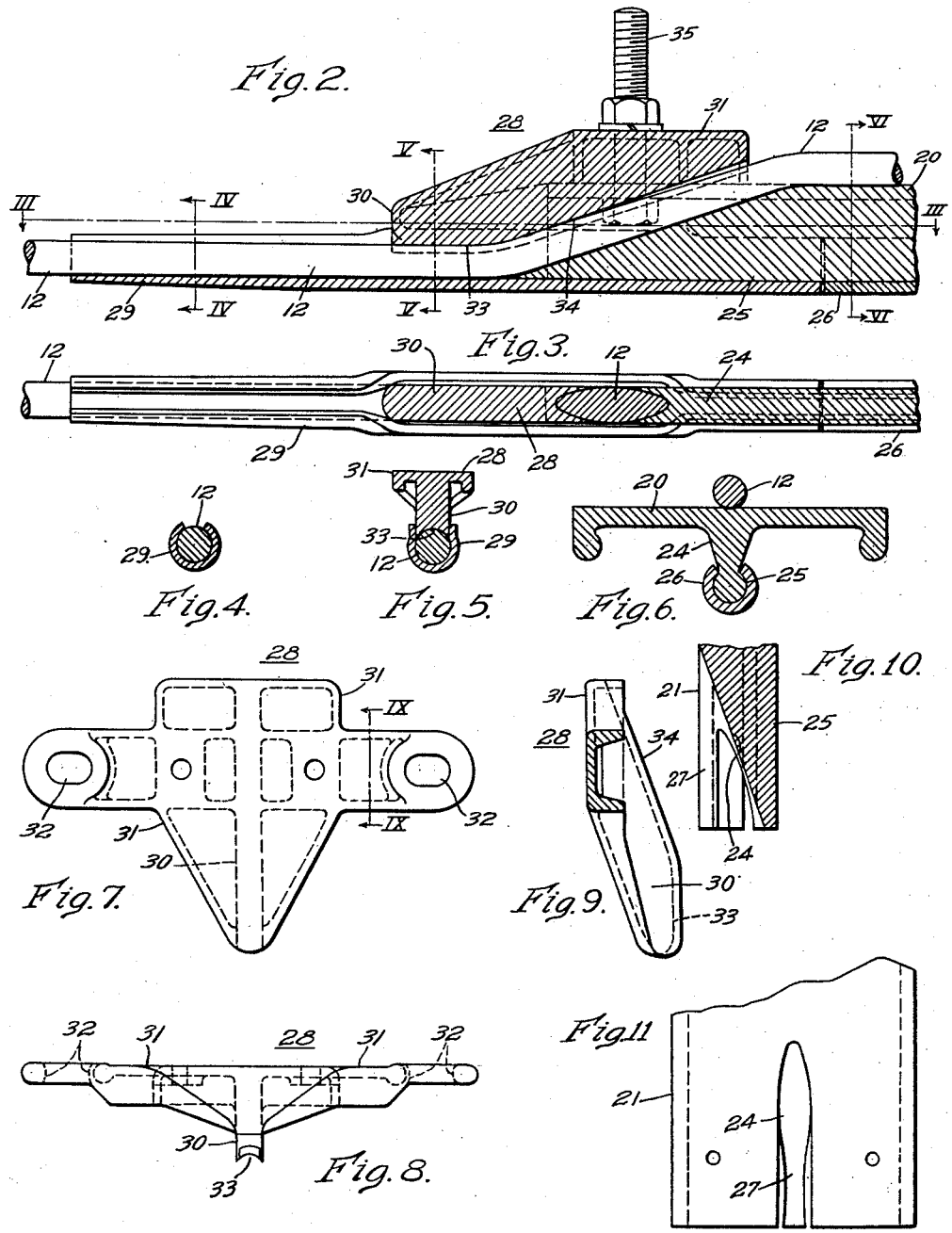

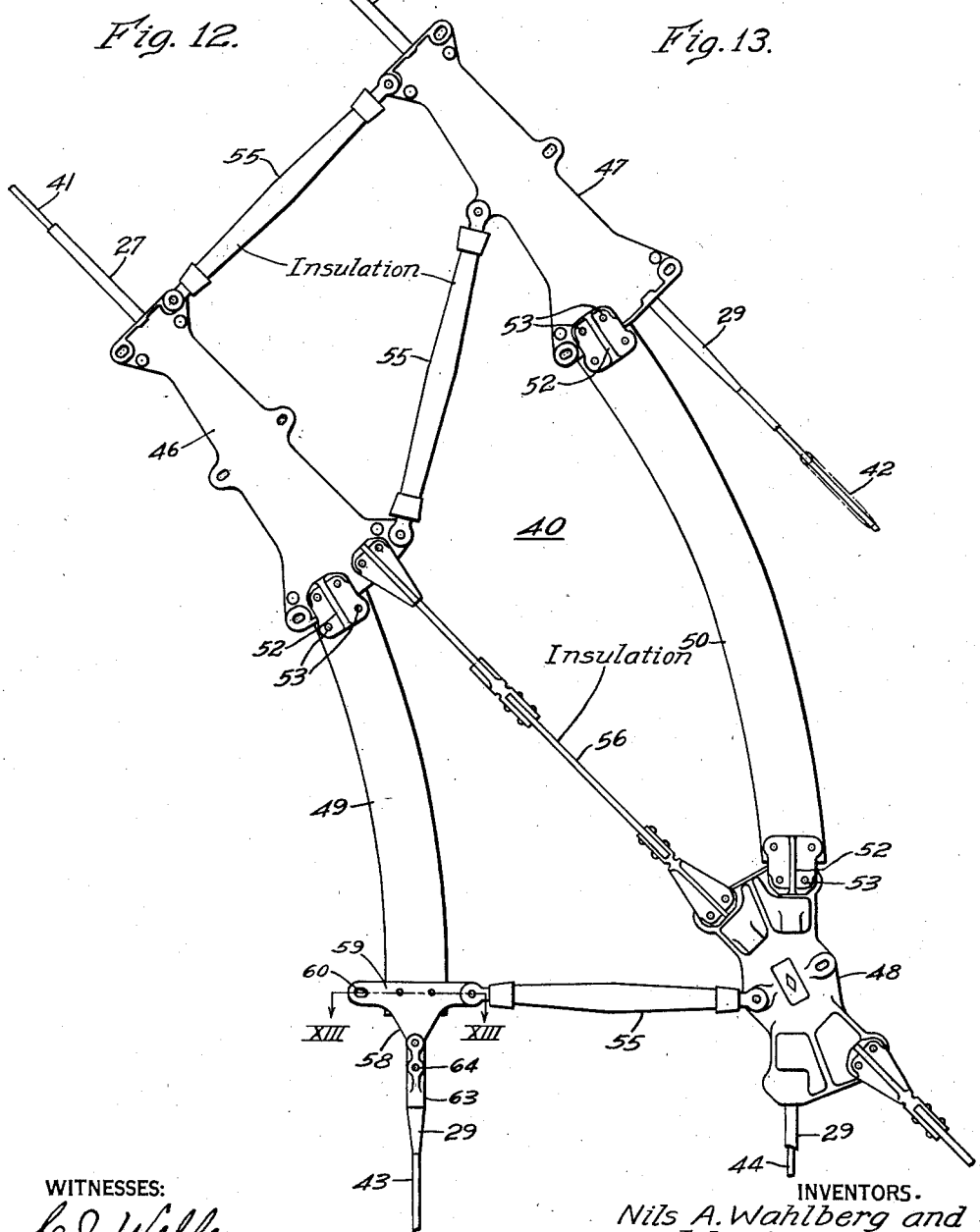

2,239,582

UNITED STATES PATENT OFFICE 2,239,582

OVERHEAD LINE CONSTRUCTION FOR TROLLEY BUS SYSTEMS

Nils A. Wahlberg, Pittsburgh, and John L. Crouse, Edgewood, Pa., assignors to Westinghouse Electric & Manufacturing Company, East Pittsburgh, Pa., a corporation of Pennsylvania Application July 10, 1937, Serial No. 152,914

6 Claims. (Cl. 191—40)

Our invention refers, generally, to overhead trolley systems, and it has reference in particular to a rigid unitary construction for overhead trolley systems.

The construction of overhead trolley systems presents an increasingly difficult problem in view of the trend towards higher speeds. As the speed of electrically-propelled vehicles is increased, it becomes more and more important to provide a smooth and continuous conducting medium for the transmission of electric power to the vehicle, since any irregularities in the trolley line not only tend to dewire the current collector and delay the vehicle, but also increase the rate of wear of the trolley wire at such points, and are a source of noise to the disturbance of the passengers within the vehicle.

In the conventional method of construction, it is necessary to use a large number of supporting pull-off wires attached to the trolley wire at close intervals in order to approximate a smooth curve, and even then the portions of trolley wire on opposite sides of such points of attachment will be in angular relation, thus preventing the current collector from passing smoothly by such points at any appreciable speed. As these pull-off wires must be under great tension, they must be provided with substantial anchorage. It may therefore be seen that in order to even approximate a smooth curve in a trolley wire by the conventional method, it is essential to have a large number of anchorage points as well as a veritable maze of overhead supporting wires. This construction is not only expensive to install and maintain, but is further exceedingly unsightly, particularly when used in connection with the overhead trolley system for trolley buses, where it is necessary to support both the positive and negative conductors overhead, and insulate them from each other.

It is, therefore, generally an object of our invention to provide a construction for an overhead trolley system utilizing an assembly of rigid conductor members.

Another object of our invention is to provide a construction for overhead trolley systems wherein a unitary assembly of rigid curved members may be adapted to provide a smooth transition between adjacent portions of straight conductor, or combined with other overhead trolley fixtures to provide a unit construction.

A further object of our invention is to provide a rigid section member for use as a unitary assembly in an overhead trolley system.

Another object of our invention is to provide for utilizing conventional light-weight rolled section members, which are readily cut to any desired length, in providing a rigid curved assembly for use in an overhead trolley system.

Still another object of our invention is to provide a simplified construction for an overhead trolley system comprising a unitary assembly of rigid rolled section conductor members which shall be simple and economical to manufacture, readily installed, and easy to maintain.

Other objects of our invention will, in part, be obvious and, in part, be explained hereinafter.

Our invention, accordingly, is disclosed in the embodiments thereof shown in the accompanying drawings, and comprises the features of construction, combination of elements, and arrangement of parts, which will be exemplified in the construction hereinafter set forth, and the scope of the application of which will be indicated in the appended claims.

In practicing our invention we prefer to utilize a unitary assembly of rigid curved conductor members and insulating means to provide a self-supporting curved portion of an overhead trolley system, thereby reducing the number of supporting wires required. Such an assembly may be used at a curve in the line, in connection with adjacent straight portions of trolley wire which intersect at an angle, to provide a smooth transition therebetween, or in association with other overhead trolley fixtures to provide, for instance, a unitary assembly for an intersection of a pair of main and branch lines. End means of fittings may be used to position the rigid conductor members and align a trolley wire therewith, while separate approach members may be used to engage the trolley wire and end means to provide a smooth approach for a current collector.

For a further understanding of the nature and scope of our invention, reference may be had to the following detailed description, taken in connection with the accompanying drawings in which:

Figure 1 is a plan view of a rigid curve construction for an overhead trolley system, embodying a preferred form of our invention, Fig. 2 is an enlarged section view of an end of one of the curved conductor members taken along the line II of Fig. 1.

Fig. 3 is a sectional view taken along the line III—III of Fig. 2,

Fig. 4 is a sectional view taken along the line IV—IV of Fig. 2,

Fig. 5 is a sectional view taken along the line V—V of Fig. 2,

Fig. 6 is a sectional view taken along the line VI—VI of Fig. 2,

Fig. 7 is a plan view of an end member of Fig. 1,

Fig. 8 is an end elevation view of the end member of Fig. 7,

Fig. 9 is a part section view of the end member of Fig. 7, along the line IX—IX of Fig. 7, Fig. 10 is a part sectional view of a rigid conductor member taken along the line X—X of Fig. 1, Fig. 11 is an enlarged plan view of the end of a rigid conductor member of Fig. 1, Fig. 12 is a plan view of a modification of our invention applied to a construction for an intersection of a pair of branch trolley conductors with a pair of main trolley conductors, and Fig. 13 is an enlarged sectional view of the end member of Fig. 12 along the line XIII—XIII.

Referring particularly to Fig. 1, there is shown an embodiment of our invention in a rigid construction for a curved portion of a trolley bus line, in which a pair of strain plate members 11 may be adapted to engage and support a pair of trolley wires 12 and 14 of opposite polarity, and maintain adjacent portions of the wires 12 and 14, respectively, in tension in angular relation to each other. The trolley wires may be maintained in engagement with the strain plates 11 in any desired manner, such as by means of U-bolts 16, as shown. Insulating means of any form, comprising for instance, a pair of separate insulating members 18 and 19, respectively, may be utilized to maintain the strain plate members 11 in spaced relation, thus holding the trolley wires in operating relation with each other.

To provide for smooth transition between the angularly related portions of the trolley wires 12 and 14, respectively, rigid curved conductor members 20 and 21 may be associated with the strain plate members 11, being secured thereto in any desired manner, such as by means of bolts 23. These rigid conductor members 20 and 21 may comprise rigid rolled section members with a cross-section such as shown in Fig. 6, having a central web portion 24 provided with an enlarged runner portion 25, upon which a renewable wear surface 26 may be secured in any desired manner, such as by providing a longitudinal U-shaped sheath which may be slipped over the runner portion 25 and clinched into engagement therewith. Downwardly inclined slots 27 may be provided at the ends of the channel members 20 and 21 in a manner such as shown in Figs. 1, 10 and 11, for positioning the trolley wires which are disposed along the top of the channel members.

End members 28 may be provided at the ends of the rigid conductor members 20 and 21 to secure the trolley wires in association therewith, and to align the trolley wires in tangential relation with the ends of the rigid conductor members, while renewable approach members 29, secured in engagement with the end members 28 and trolley wires, are disposed to provide a smooth approach for a current collector (not shown).

In a preferred form, end members 28 may, as seen from reference particularly to Figs. 7, 8 and 9, comprise a longitudinal central body portion 30 having a laterally extending flange portion 31 provided with eyes 32. The body portion 30 may be provided with a groove 33 on the underside, adapted to receive the trolley wire. To provide for engaging the trolley wire in the downwardly inclined end slot 27 of a rigid conductor member, one end of the body portion 30 may be provided with an inclined seating surface. This inclined surface is adapted to cooperate with the downwardly inclined slot 27, as shown in the end of the rigid conductor member 21, when the end member 28 is positioned in relation therewith, for securing the trolley wire therebetween, as shown in Fig. 2. The end member 28 may be secured in engagement with the rigid conductor member 20 in any suitable manner, such as by bolts 35, thereby securely positioning the trolley wire and aligning it in tangential relation to the end of the rigid conductor member 20.

Referring particularly to Figs. 2, 9, 10 and 11, it may be seen that the inclined slot 27 in the end of the rigid conductor member leaves a tapered portion of the web 24 with which the inclined seating portion 34 of the end members 28 cooperates to provide an upwardly inclined opening wherein a trolley wire 12 may be secured in fixed relation to the rigid conductor member 20.

The renewable approach members 29 may be of any desired form, comprising, for example, a U-shaped channel made from a strip of metal having a high conductivity. Each member may be attached as shown in Figs. 2 to 6, by placing it about the trolley wire, grooved body member 30, and runner member 25, with one end thereof in abutting relation to the end of the wear member 26, and pressing the upper edges of the U-section together, thereby securely clamping the approach member to these parts. As shown in Figs. 3, 5 and 6, the grooved wire seat 30 is larger in cross-section than the web 24 of the rigid conductor member, so that when the approach member 29 is pressed about these parts it is securely locked in position without the necessity of providing any extra fastening means or having projecting interlocking portions to be interfitted.

Referring to Fig. 12, which illustrates another form of our invention, the reference numeral 40 denotes, generally, a unitary assembly for use in an overhead trolley system at an intersection of a pair of main line trolley conductors 41 and 42 with a pair of branch line trolley conductors 43 and 44. Switch means shown as a pair of trolley frogs 46 and 47, of the conventional type, may be used to provide for the intersection of the main and branch trolley conductors, while a cross-over 48, also of conventional form, may be used to provide a smooth path for a current collector where the branch conductor 44 crosses the main conductor 41.

In order to provide for smooth transition of a current collector from the branch conductors 43 and 44 to the main conductors 41 and 42, respectively, rigid curved conductor members 49 and 50 are used in association with the trolley frogs 46 and 47 and cross-over 48 to provide a rigid curved approach thereto.

The rigid conductor members 49 and 50 may be of the same construction as the members 20 and 21 of Fig. 1, and comprise lightweight channel members having a centrally disposed web 24 with an enlarged runner portion 25 upon which a renewable wearing surface 26 may be secured, as shown in Fig. 6. The conductor members 49 and 50 may be of such form as to provide a rigid, lightweight self-supporting member, being readily cut to length as required from a stock supply, and rolled to any desired curvature.

In order to secure the rigid conductor members 49 and 50 in association with the trolley frogs 46 and 47, and cross-over 48, thereby providing a unitary assembly, flanged end members 52 may be secured adjacent to the ends of the conductor members and maintained in engagement with the switch means and cross-over by bolts 53, or in any other suitable manner. Insulating members 55 may be used to maintain the switching means, curved conductor means, and cross-over in fixed spaced relation, while an insulating spacer bar 56 of conventional design may be used to provide a continuous path for the current collector along the main line 41 between the trolley frog 46 and the cross-over 48. In this instance, only one of the trolley conductors, namely 43, is attached to the end of a rigid conductor member by means of a suitable end member, the other trolley conductors being attached to the frogs 46 and 47 or the cross-over 48, as the case may be.

To provide for securing the trolley conductor 43 in association with the rigid conductor member 49, an end member 58 may be provided. In one form, as illustrated in Fig. 13, the end member 58 may comprise a transverse flange portion 59 having eyes 60 to facilitate positioning, and being provided with a centrally disposed longitudinal runner portion 61 on the lower side. Bolt holes 62 in the flange portion provide for securing the end member 58 to the rigid conductor member 49 while an extended body portion 63 of the end member may be provided with a longitudinal opening therethrough, in which a trolley wire 43 may be secured in any well known manner, such as by means of set screws 64.

Renewable approach members 29, of the same form as shown in Fig. 1, may be used in conjunction with the end member 58, frogs 46 and 47 and cross-over 48 to provide a smooth approach for the trolley shoes or collectors and may be clinched about the wire seating portions (not shown) of these devices as described hereinbefore with respect to Fig. 1.

In our invention, the unitary assembly, including the rigid curved conductor members may be erected as a unit, requiring only the attachment of a few supporting cables, the raising into position, and the securing thereto of the trolley wires. The end members serve not only to aline the trolley wires to provide a smooth approach but act also to position the unit, reducing the number of stay wires required.

From the foregoing description, together with the accompanying drawings, it may be seen that we have provided a greatly simplified construction for curved portions of an overhead trolley system wherein a unitary assembly for a curved portion may be produced, which assembly is readily incorporated in the overhead system as a unit. This construction is not only simple to manufacture, but is easily installed and provides for greatly reducing the number of supporting pull-off wires necessary to conventional type of construction. It facilitates not only the installation, by being assembled as a unit prior to installation, but enables repairs to be made much more easily, by merely stripping off a worn runner portion, which is readily removable, and pressing on a new one with the assembly yet in service.

Since certain changes may be made in the above construction, and different embodiments of the invention may be made without departing from the spirit thereof, it is intended that all the matter contained in the foregoing description, or shown in the accompanying drawings, shall be taken as illustrative, and not in a limiting sense.

We claim as our invention:

1. The combination in a rigid construction for overhead trolley systems, of a pair of rigid curved runner members each having a centrally disposed longitudinal web with an enlarged edge portion the width of which is substantially equal to that of a trolley wire, a protective wear sheath extending substantially the length of the web and crimped about the enlarged edge portion thereof, a downwardly inclined wire seating slot at each end of the runner member, an end member attached to the runner member having a wire seat with a width substantially equal to that of the trolley wire for securing the trolley wire in the said slot, and a separate renewable approach member adapted to be secured to the trolley wire and the runner member adjacent the end thereof comprising a U-shaped sheath having upstanding side portions adapted to be crimped about the trolley wire and the end portion of the enlarged edge portion on each side of the wire seat to provide constricted throat portions to interlock with the wire seat and provide a smooth approach for a current collector.

2. A rigid curve construction for an overhead trolley wire system comprising, a relatively light weight rigid curved member supported beneath a trolley wire, said member having a relatively flat back portion with a dependent runner portion on the lower side having an edge portion with a width substantially equal to that of the trolley wire and a section of reduced thickness intermediate the edge portion and the back portion and downwardly inclined cutaway portions in the back portion and runner portion adjacent the ends in alignment with the edge portion, a renewable wear surface of relatively high conductivity having upstanding side portions clinched about the edge portion, renewable end members having depending wire seats of substantially the width of the trolley wire positioned in the cutaway portions and secured to the curved member at the ends to depress the trolley wire therein into alignment with the said edge portion, and renewable wear members having upstanding side portions pressed into engagement about the depending wire seats and trolley wires to interlock mechanically therewith and abut the renewable wear surface of the runner portion and provide a smooth surface for a current collector.

3. A rigid curve construction for an overhead trolley system comprising, a relatively light weight curved structural member having a substantially flat back portion with a centrally positioned longitudinal runner with an enlarged edge portion on the lower side of substantially the width of a trolley wire and slots downwardly sloping from the back portion in alignment with the runner edge portion at the ends for receiving a trolley wire, means disposed to engage a continuous trolley wire to position adjacent sections thereof in angular relation above and tangent to the ends of the runner edge portion, end members having lateral flanged portions secured to the flat back portion of the curved member and depending wire seats of substantially the width of the trolley wire positioned in the slots and secured to the structural member to depress the sections of the trolley wire into alignment with the runner edge portion, and a renewable approach member having upstanding sides clinched inwardly about the trolley wire, at least a portion of the enlarged edge portion of the runner and wire seat to mechanically interlock therewith and prevent longitudinal movement of the approach member.

4. A rigid intersection unit for an overhead trolley system comprising, a pair of strain members adapted to maintain adjacent sections of a pair of trolley wires in angular relation, insulating means disposed between the strain members to secure said strain members in spaced relation, a pair of light weight rigid curved channel members adapted to be positioned beneath the trolley wires and having webs on the lower sides with enlarged runner portions of a width substantially equal to the width of one of the trolley wires at the lower edges and sections of reduced thickness thereabove, and downwardly inclined trolley wire slots on the upper sides adjacent to each end in alignment with said webs, renewable wear members of lesser length than the said runner portions having upstanding side portions pressed inwardly thereabouts positioned intermediate the ends of the runner members, separate end members provided with depending wire seats of the width of the trolley wire positioned in the slots to align and secure a trolley wire in the slots in tangential relation to the ends of the channel members, and substantially U-shaped renewable approach members abutting the same wear members having the upper portions of the sides thereof pressed inwardly into engagement about the trolley wire, wire seats and enlarged edge portions of the runner members to provide constrictions at each end of the wire seats so as to interlock mechanically therewith to prevent longitudinal movement of the approach members and provide for the smooth passage of current collectors.

5. A rigid unit construction for an intersection between pairs of trolley wires in an overhead trolley system comprising, a plurality of trolley fixtures, a plurality of rigid curved members having runner portions on the lower sides thereof, means securing the fixtures and rigid curved members in fixed relation, insulating members for positioning the rigid curved members and fixtures in spaced relation to provide a substantially rigid assembly thereof, and means for connecting the trolley wires to the fixtures and rigid curved members to transmit the tension thereof to the said assembly and support the said trolley wires.

6. A substantially rigid intersection structure for connection in an overhead trolley bus system as an integral unit at an intersection of pairs of main and branch conductors comprising, a pair of switch devices, a pair of substantially rigid curve members having downwardly projecting runner portions, a crossing device, an insulating spacer connected between one of the switch devices and the crossing device to provide an insulating path for guiding a current collector therebetween, means for rigidly connecting one of the curve members to a switch device and to the crossing device, and the other curve member in parallel relation thereto to the other switch device, insulating means connected to switch devices and at least one of curve members to maintain them in fixed spaced relation and provide a substantially rigid intersection unit, and means for terminating the trolley wires and so connecting them to the unit as to transmit the tension of the trolley wires thereto and effect a smooth passage for a current collector.

NILS A. WAHLBERG.
JOHN L. CROUSE.